Jan. 27, 1953     K. E. McCONNAUGHAY     2,626,875
PROCESS OF PREPARING A PAVING COMPOSITION
Filed May 24, 1944
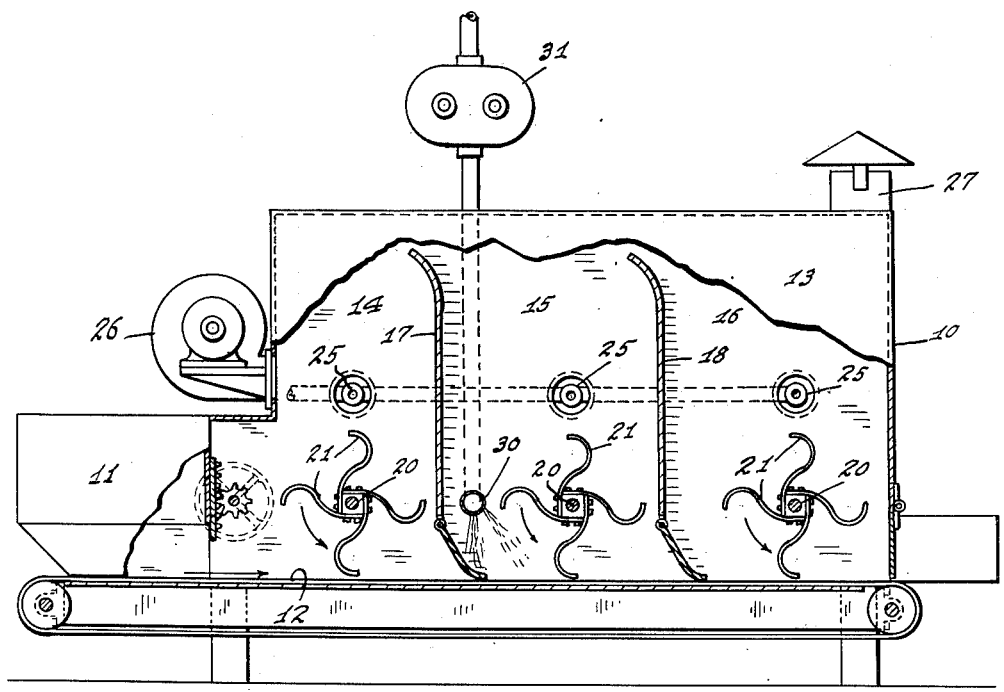
INVENTOR.
KENNETH E. McCONNAUGHAY,
BY
ATTORNEYS.

Patented Jan. 27, 1953

2,626,875

UNITED STATES PATENT OFFICE 2,626,875

PROCESS OF PREPARING A PAVING COMPOSITION

Kenneth E. McConnaughay, West Lafayette, Ind.

Application May 24, 1944, Serial No. 537,139

4 Claims. (Cl. 117—65)

My invention relates to a process and apparatus for producing bituminous paving compositions of the type in which the binder as applied to the aggregate is in the form of an emulsion.

When the aggregate to be embodied in such a paving composition is wet or cold or both wet and cold, it is frequently difficult to obtain adequate covering of the aggregate particles. Drying of the aggregate or treating the surface with some preparation fitted to aid the bonding of bitumen to it will facilitate the coating of an aggregate originally wet; but such steps are expensive and sometimes troublesome. The bonding of bitumen in the form of an aqueous emulsion to the surfaces of aggregate particles is facilitated by increasing the quantity of water in the emulsion; but frequently if enough water is employed to provide a satisfactory coating, the resulting coating composition is so slow to set up and so fluid that rains may wash it from the aggregate.

It is the object of my invention to provide an apparatus and process through the use of which a satisfactory paving composition can quickly and economically be produced from aggregate which is originally damp or cold, or both damp and cold.

In carrying out my invention, I may employ any desired form of bituminous emulsion, such as an aqueous asphalt emulsion with or without added solvent. The aggregate may or may not be subjected to a preliminary warming operation prior to the application of the emulsion; but even if a preliminary warming is employed, I supply heat to and raise the temperature of the composition as its mixing is being continued. Desirably, both the rate of heat supply and the rate of mixing are rapid in order to confine the heating of the composition as far as possible to the coating material itself and to the extreme surface portions of the aggregate particles.

The accompanying drawing illustrates apparatus embodying my invention, the single figure being a side elevation, with portions broken away.

In the drawing, I have illustrated a combined heater and mixer 10 which, except for the addition of means for supplying the bituminous coating composition, is the same as the drier illustrated in my co-pending application Serial No. 478,609, filed March 10, 1943, now Patent No. 2,458,617. Since the primary purpose of this piece of apparatus in practicing the present invention is to coat the aggregate particles with the bitumen coating composition, it will hereinafter be referred to as a mixer.

The particular mixer 10 shown in the drawing embodies an aggregate hopper 11 from which aggregate is conveyed by a belt conveyor 12 through the lower portion of a housing 13. The housing 13 is divided interiorly into three chambers 14, 15, and 16 by vertical, transverse partitions 17 and 18. In each of the chambers 14, 15, and 16, there is located a transversely extending, horizontal shaft 20 carrying a multiplicity of teeth 21 the outer ends of which, in the rotation of the shaft 20, pass close to the upper stretch of the belt conveyor 12. The teeth 21 are desirably shaped to be concave forwardly in the direction of their rotation, so that as the shafts 20 are rotated the teeth 21 will engage aggregate on the conveyor 12 and tend to lift it. Suitable means (not shown) is provided for rotating the several shafts 20 at a speed great enough to insure that the aggregate picked up from the conveyor by the teeth 21 will be thrown upward with considerable velocity and will impinge forcibly upon the walls, including the top wall, and the partitions 17 and 18 of the housing 13.

For the purpose of heating the material passing through the housing, each of the chambers 14, 15, and 16 may be provided with a burner 25. To aid in the drying operation, I may employ a blower 26 which forces air into and through the housing 13 to an escape flue 27.

The construction of the mixer 10, as so far described, is the same as that shown and more fully set forth in my co-pending application above referred to. It is to be noted that in the instant application this particular form of mixer is shown merely by way of example; as mixers of other forms may be used in carrying out my process.

In one of the compartments 14, 15, and 16, I place a spray bar 30 through which the bituminous emulsion used is discharged upon the aggregate. A pump 31 driven at a speed coordinated to the rate at which aggregate is fed to the mixer on the belt 12 forces the emulsion from any convenient source to the spray bar 30.

The emulsion employed may be any desired form of aqueous bituminous emulsion. It may, for example, consist of nothing more than 60% bitumen (such as asphalt of 100 to 150 penetration) and 40% water, with added emulsifying agent.

In the operation of the apparatus shown in the drawing, the aggregate is fed from the hopper 11 on the conveyor 12 into the first compartment 15 where it is engaged by the rapidly rotating teeth 21 on the shaft 20 in such compartment. These teeth separate the aggregate particles and elevate them into the heated upper portion of the compartment 14, whereby the aggregate is both warmed and dried to a slight extent. I do not contemplate a thorough drying of the aggregate in the compartment 14 or even its elevation to a comparatively high temperature. Thus, heat may be supplied to the compartment 14 at such a rate as will cause the aggregate to leave the compartment 14 at a temperature of 120° to 150° F.

As the aggregate passes out of the compartment 14 into the compartment 15, it receives the sprayed emulsion from the spray bar 30, such emulsion desirably being supplied in heated condition. In the compartment 15, the aggregate particles are again acted upon by rapidly rotating teeth and elevated into the heated upper portion of the compartment, at the same time being thoroughly mixed with the coating composition. Further mixing of the aggregate and coating composition, and further heating, occur in the last compartment. Leaving the last compartment 16, the aggregate particles will be thoroughly coated with a bituminous coating composition which is firmly bonded to them.

Depending upon the character of the emulsion supplied to the aggregate, the coating composition produced may be either immediately laid or may be stored. If it is to be stored, its setting-up may be delayed by the addition of a solvent, such as kerosene, having a comparatively high boiling point so that it will not be completely vaporized in the heated mixer.

As previously mentioned, I prefer to rotate the shafts 20 at a speed sufficient to cause the aggregate particles to be thrown upwardly with considerable velocity, whereby they forceably impinge upon the walls, including the top wall, and the partitions of the housing 13. As brought out in my prior Patent No. 2,298,495, issued October 13, 1942, the mixing action produced in this manner is very rapid, and it is therefore unnecessary for the aggregate being treated to remain in the mixer for any extended period of time. If, as is desirable, the upper portions of the compartments in the mixer housing 13 are kept at a temperature in the neighborhood of 900–1100° F., the heating of the mixture will be largely confined to the coating material and to the surface portions of the aggregate particles. Although the average temperature of the paving composition emerging from the last mixing compartment 16 may be only 180°–200°, the coating material itself and the adjacent surface portion of the aggregate particles will have been heated to a considerably higher temperature. At this higher temperature, the coating composition forms a foam which spreads easily and quickly over the surfaces of the particles, which does not tend to collect in unduly large proportions on the small particles, and which is bonded well to the aggregate.

It is not essential in the practice of my invention that the mixer, if of the type illustrated, have a plurality of compartments and rotary mixing elements or, if it has a plurality of compartments, that the spray-bar 32 be located in any particular one of those compartments. It is essential only that heat be added to the mix after the aggregate and the coating composition have been brought together. In the preferred form of mixer, the aggregate particles during a large portion of the time are out of contact with other particles or with supporting surfaces and hence are exposed on all sides to a heated atmosphere. As a result, the loss of moisture from the coating is rapid. As moisture is lost from the coating to the surrounding atmosphere, it is replaced by any moisture on the surface of the aggregate particles; and as it is moisture on the surface of the aggregate particles which interferes with proper adherence of the coating, the removal of this moisture into the binder-film makes for better adherence of the coating to the particles.

When used in the process of this application, free moisture on the surfaces of the aggregate particles is very quickly removed, even with the application of only a small amount of heat in the mixing process.

I claim as my invention:

1. A process for preparing a bituminous paving composition, comprising the steps of adding an emulsified bituminous binder to aggregate, mixing the aggregate and binder to distribute the latter as a coating over the surfaces of the aggregate particles, separating the mixture into discrete coated particles, and passing such discrete coated particles through an atmosphere having a temperature in the neighborhood of 1000° F.

2. A process for preparing a bituminous paving composition, comprising the steps of adding an emulsified bituminous binder to aggregate, mixing the aggregate and binder to distribute the latter as a coating over the surfaces of the aggregate particles, separating the mixture into discrete coated particles, and passing such discrete coated particles briefly through burning gases, the time occupied by each particle in passing through such burning gases being sufficient to cause vaporization of water in its coating but insufficient to raise materially the temperature of the particle itself.

3. A process for preparing a bituminous paving composition, comprising the steps of adding to aggregate an aqueous emulsion of a bituminous binder, mixing the aggregate and emulsion to distribute the latter as a coating over the surfaces of the aggregate particles, separating the mixture into discrete coated particles, and heating the coating of the discrete particles to vaporize the water in such coating by passing such discrete coated particles briefly through burning gases.

4. A process for preparing a bituminous paving composition, comprising the steps of adding to aggregate an aqueous emulsion of a bituminous binder, mixing the aggregate and emulsion to distribute the latter as a coating over the surfaces of the aggregate particles, and repeatedly subjecting the exteriors of the coated particles to contact with burning gases.

KENNETH E. McCONNAUGHAY.

REFERENCES CITED

The following references are of record in the file of this patent:

UNITED STATES PATENTS

| Number | Name | Date |
|---|---|---|
| 684,739 | Amies | Oct. 15, 1901 |
| 765,975 | Hooley | July 26, 1904 |
| 1,237,852 | Zimmer | Aug. 21, 1917 |
| 1,343,680 | Pine | June 15, 1920 |
| 1,546,335 | Browne | July 14, 1925 |
| 1,596,232 | Black | Aug. 17, 1926 |
| 1,632,456 | Swan | June 14, 1927 |
| 1,724,687 | Stansbury | Aug. 13, 1929 |
| 1,836,754 | Hepburn | Dec. 15, 1931 |
| 1,943,858 | Dwight | Jan. 16, 1934 |
| 1,945,058 | McConnaughay | Jan. 30, 1934 |
| 1,968,871 | Withee | Jan. 8, 1935 |
| 2,028,745 | Hendrick | Jan. 28, 1936 |
| 2,051,731 | McConnaughay | Aug. 18, 1936 |
| 2,152,798 | Fuller | Apr. 4, 1939 |
| 2,283,192 | Ditto | May 19, 1942 |

FOREIGN PATENTS

| Number | Country | Date |
|---|---|---|
| 5,712 | Great Britain | of 1904 |
| 164/31 | Australia | Jan. 21, 1932 |
| 392,620 | Great Britain | May 25, 1933 |